(12) United States Patent
Colombi et al.

(10) Patent No.: US 8,754,544 B2
(45) Date of Patent: Jun. 17, 2014

(54) APPARATUS FOR SYNCHRONIZING UNINTERRUPTIBLE POWER SUPPLIES

(75) Inventors: Silvio Colombi, Losone (CH); Nicolas Borgeaud, Breganzona (CH)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/285,587

(22) Filed: Nov. 22, 2005

(65) Prior Publication Data

US 2006/0167569 A1 Jul. 27, 2006

Related U.S. Application Data

(60) Provisional application No. 60/647,661, filed on Jan. 27, 2005.

(51) Int. Cl.
*H02J 9/00* (2006.01)
(52) U.S. Cl.
USPC ............................................................ 307/64
(58) Field of Classification Search
USPC ....................................................... 307/43, 64
See application file for complete search history.

(56) References Cited

U.S. PATENT DOCUMENTS

| | | | | |
|---|---|---|---|---|
| 4,575,671 A | * | 3/1986 | Lee et al. | 322/16 |
| 6,268,665 B1 | * | 7/2001 | Bobry | 307/66 |
| 6,493,243 B1 | | 12/2002 | Real | |
| 6,784,634 B2 | * | 8/2004 | Sweo | 318/727 |
| 7,038,923 B2 | * | 5/2006 | Zhou | 363/72 |
| 2001/0022472 A1 | * | 9/2001 | Codina et al. | 307/66 |
| 2003/0222507 A1 | * | 12/2003 | Deng | 307/87 |
| 2005/0200205 A1 | | 9/2005 | Winn | 307/64 |

OTHER PUBLICATIONS

Search Report for corresponding European Application No. EP 06124502.3, dated Nov. 30, 2012.
Holtz, J. et al., "Multi-Inverter UPS System with Redundant Load Sharing Control", IEEE Transactions on Industrial Electronics, vol, 37, No. 6, pp. 506-513, XP000179413, ISSN: 0278-0046, Dec. 1, 1990.
Radwan, A. "Concepts of redundant UPS technology", NTZ (Nachrichtentechnische Zeitschrift), vol, 51, No. 3, Jan. 8, 1998.

* cited by examiner

*Primary Examiner* — Rexford Barnie
*Assistant Examiner* — Dru Parries
(74) *Attorney, Agent, or Firm* — General Electric Company (57) ABSTRACT

An Intelligent Synchronization Module (ISM) for an Uninterruptible Power Supply (UPS) system for servicing a load is disclosed. The UPS system has at least one of a first UPS group and a second separate and independent UPS group, each of the first and second UPS groups having a master UPS. The ISM has a processing circuit and a storage medium, readable by the processing circuit, storing instructions for execution by the processing circuit for: assigning the first UPS group the role of master group and the second UPS group the role of slave group; and, passing phase information relating to the master group to the slave group, thereby enabling the master UPS of the slave group to effect synchronization with the master group.

20 Claims, 8 Drawing Sheets

APPARATUS FOR SYNCHRONIZING UNINTERRUPTIBLE POWER SUPPLIES

CROSS REFERENCE TO RELATED APPLICATIONS

This application claims the benefit of U.S. Provisional Application Ser. No. 60/647,661, filed Jan. 27, 2005, which is incorporated herein by reference in its entirety.

BACKGROUND OF THE INVENTION

The present disclosure relates generally to uninterruptible power supplies (UPSs), and particularly to synchronization control systems for control thereof.

UPSs are employed in a variety of applications where a constant source of power is desired at a load. A typical UPS system involves an inverter feed path, also generally referred to as the inverter, that is operably connectable in parallel with a bypass feed path, also generally referred to as the mains. The mains may be connected to a utility, but may also receive power from some other supply not connected to a utility electrical grid. The inverter may receive power from the same source as the mains, but may also receive power from some other supply.

There are several types of UPSs depending on their operation mode. Double conversion UPSs offer the maximal protection level as the load is always fed by the inverter. On the other hand, with line-interactive UPSs, the load is fed by the mains and the inverter is used to correct the shape of the load voltage.

There are also several possible UPS configurations to supply a critical load, such as Redundant Parallel Architecture (RPA), Dual Independent Configuration, Load Bus Synchronization, and Power Tie, for example. With the RPA concept, (N+M) UPSs are paralleled to supply a load that can be fed by N UPSs only. This way, a redundancy of M units is achieved. More and more, and for high availability, Dual Independent Configurations are requested by customers. This requires the synchronization of two independent UPS groups and the use of an Intelligent Static Switch (ISS) that automatically switches the critical load from one source to the other. Another concept is Load Bus Synchronization where two independent UPS groups can be temporarily synchronized in order to move the critical load from one side to the other for maintenance purposes. An extension of the Load Bus Synchronization concept is the Power Tie concept, where the two independent UPS groups are permanently synchronized and their load shared as if they were a unique UPS group in a RPA configuration. Finally, and with consideration to the bypass configuration, it is desirable to be able to choose between two different options, a centralized bypass or decentralized bypass.

Accordingly, there is a need in the art for a control system and apparatus that allows multiple configurations of UPSs in critical power management systems.

BRIEF DESCRIPTION OF THE INVENTION

An embodiment of the invention includes an Intelligent Synchronization Module (ISM) for an Uninterruptible Power Supply (UPS) system for servicing a load, wherein the UPS system has at least one of a first UPS group and a second separate and independent UPS group, each of the first and second UPS groups having a master UPS. The ISM has a processing circuit and a storage medium, readable by the processing circuit, storing instructions for execution by the processing circuit for: assigning the first UPS group the role of master group and the second UPS group the role of slave group; and, passing phase information relating to the master group to the slave group, thereby enabling the master UPS of the slave group to effect synchronization with the master group.

Another embodiment of the invention includes an Uninterruptible Power Supply (UPS) system for servicing a load. The UPS system includes a first UPS group and a second UPS group separate from and independent to the first UPS group, each of the first and second UPS groups being configured to service the load, and an Intelligent Synchronization Module (ISM) in signal communication between the two UPS groups. The ISM is configured to assign the first UPS group the role of master group and the second UPS group the role of slave group, and to pass phase information relating to the master group to the slave group, thereby enabling the slave group to effect synchronization with the master group.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides an Intelligent Synchronization Module (ISM) for allowing multiple configurations of an Uninterruptible Power Supply (UPS) system that services at least one load. In an embodiment, the UPS system has a first UPS group and a second separate and independent UPS group, with each of the first and second UPS groups having a master UPS. A function of the ISM is to assign the first UPS group the role of master group and the second UPS group the role of slave group, and to pass phase information relating to the master group to the slave group, thereby enabling the master UPS of the slave group to effect synchronization with the master group. In a more general sense, the ISM is a control system that exchanges information, performs synchronizations, and executes control algorithms and commands.

Figure 1:
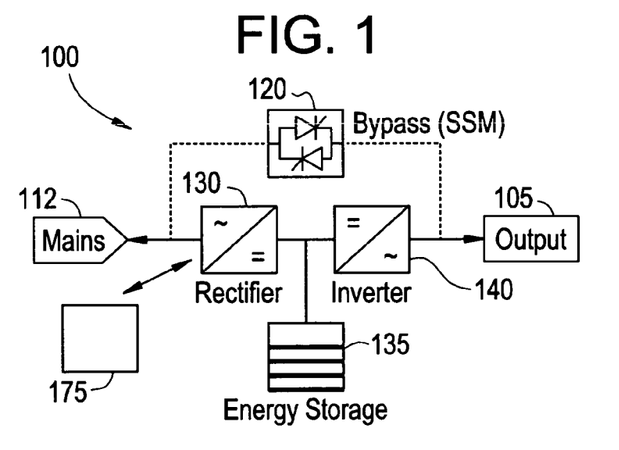
FIG. 1 depicts an exemplary block diagram of a double conversion UPS system for use in accordance with an embodiment of the invention.

FIG. 1 shows an exemplary block diagram of a typical double conversion UPS system 100. The UPS system 100 consists of two converter blocks, a rectifier 130 and an inverter 140, and energy storage device 135 such as a battery for example. During normal operation, the rectifier 130 converts the mains input supply 112 to regulated DC to charge the energy storage-battery bank 135 as well as supply power to the inverter 140. The inverter 140 converts the DC to a voltage and frequency regulated AC output at all times. During a stored energy mode, that is, during a condition where the mains input supply 112 is not available, the inverter 140 draws power from the energy storage device 135, thereby enabling continued supply the output or load 105. Bypass operation is possible through a Static Switch Module (SSM) 120.

Figure 2:
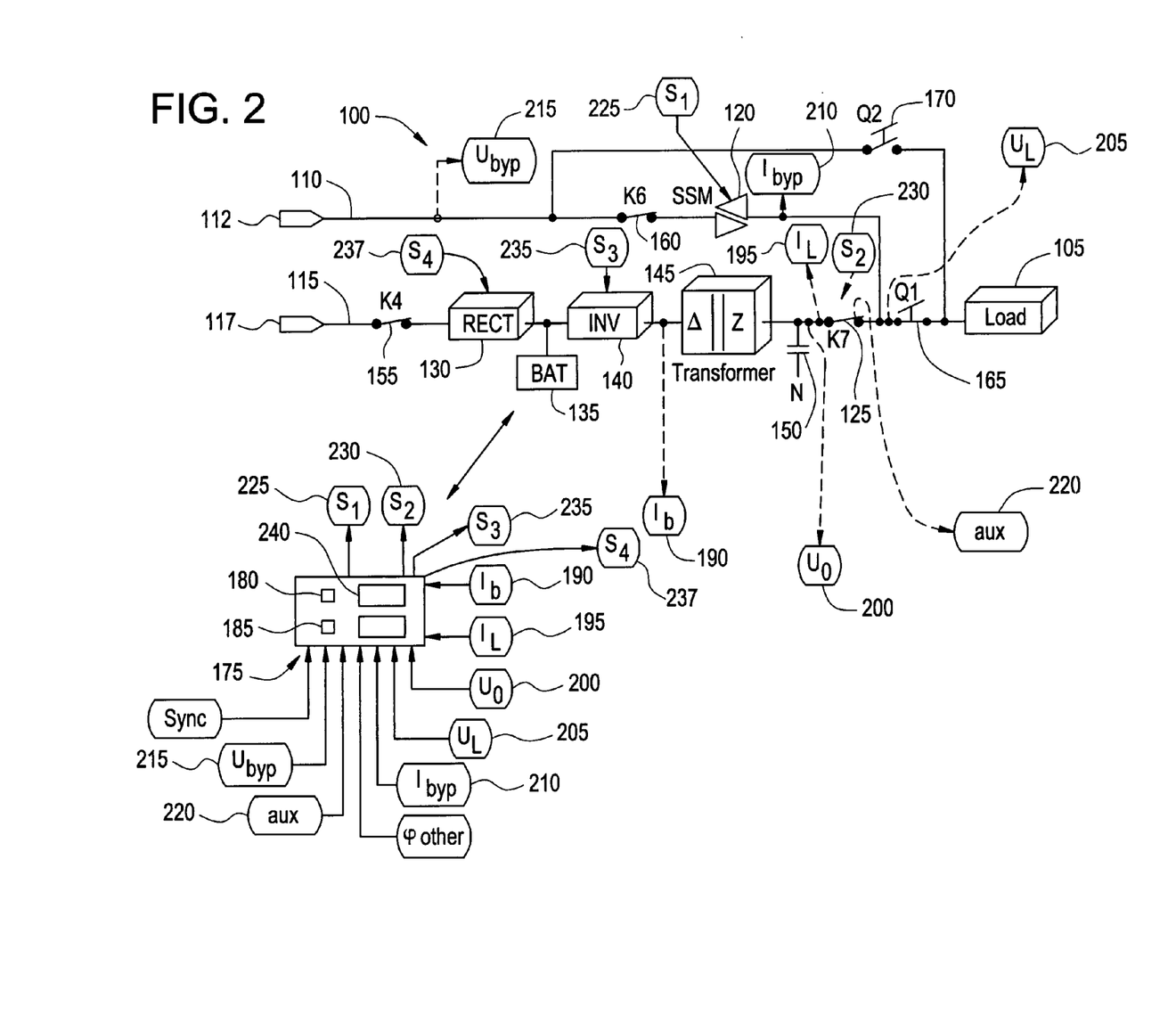
FIG. 2 depicts the exemplary UPS system of FIG. 1 in expanded detail.

FIG. 2 expands on the schematic of FIG. 1 to show further detail of the exemplary UPS system 100 that services the load 105. Here, the UPS 100 includes a bypass feed path 110 and an inverter feed path 115 that are operable in parallel with each other during the transfer of power from one path to the other. The power source 112 for the bypass feed path 110 may be a utility or other main power source, as discussed previously. The power source 117 for the inverter feed path 115 may be the same as that of the bypass feed path 110 (as illustrated in FIG. 1 for example), or it may be a different power source (as illustrated in FIG. 2 for example). The bypass feed path 110 is engagable with the load 105 via the SSM 120, also herein referred to as a first switch 120, to deliver a bypass current to the load 105, and the inverter feed path 115 is engagable with the load 105 via a second switch 125 to deliver an inverter current to the load 105. In an embodiment, the first switch 120 is a remote controllable SSM of a type known to one skilled in the art, and the second switch 125 is a remote controllable contactor of a type known to one skilled in the art. The inverter feed path 115 includes the rectifier 130, the battery 135, and the inverter 140, and may also include an output isolation transformer 145, and filtering capacitors 150. Disconnect switches (K4) 155, (K6) 160, (Q1) 165 and (Q2) 170 may be employed for additional protection and/or control and/or maintenance. In an embodiment, switches (K4) 155 and (K6) 160 are circuit breakers, and switches (Q1) 165 and (Q2) 170 are manual disconnects. The leakage inductance of isolation transformer 145 and the output capacitors 150 are used together to filter the inverter output voltage (Uo) 200.

While FIG. 1 depicts a UPS 100 in one-line diagram form, it will be appreciated that UPS 100 may have multiple phases, such as three phases for example, and that any reference herein to a current or a voltage in one phase is intended to be a reference to the current and voltage of each phase.

In an embodiment, a control system 175, illustrated generally in FIG. 1 and more specifically in FIG. 2, includes a processing circuit 180 and a storage medium 185, readable by the processing circuit 180, storing instructions for execution by the processing circuit for controlling the UPS 100 in a manner to be described in more detail below.

In an embodiment, input signals to control system 175 include inverter bridge currents (Ib) 190, inverter load currents (IL) 195, inverter output voltages (Uo) 200, load voltages (UL) 205, bypass load currents (Ibyp) 210, and bypass input voltages (Ubyp) 215, that are generated by any sensor suitable for the intended purpose. Another input signal to control system 175 may be (aux) 220 that is provided by an auxiliary contact (not specifically shown but represented also by reference numeral 220) at second switch (K7) 125 and identifies the on/off state of the main contacts of second switch 125. Further input signals to control system 175 include a $S_{sync}$ signal and a $\phi_{other}$ signal, which will be discussed in more detail below.

While reference is made to bypass feed path 110 and inverter feed path 115, it will be appreciated by those skilled in the art that the inverter load currents IL 195 are not the same as those currents flowing through contactor K4 155.

In an embodiment, output signals from control system 175 include a command signal (S1) 225 to first switch 120, a command signal (S2) 230 to second switch 125, a command signal (S3) 235 to inverter 140, and a command signal (S4) 237 to rectifier 130.

In one embodiment, output signals 225, 230, 235 and 237 may originate from control system 175. However, in another embodiment, the same output signals or any combination thereof may be analog, may originate from another source (not shown), and may be monitored and used by control system 175.

In an embodiment, the following logic is employed:
S1=(1, 0): SSM command signal (ON, OFF), respectively;
S2=(1, 0): K7 command signal (ON, OFF), respectively;
S3=(1, 0): Inverter command signal (ON, OFF), respectively; and
S4=(1, 0): Rectifier command signal (ON, OFF), respectively.

In accordance with an embodiment of the invention, the output signals from control system 175 serve to synchronize a slave UPS group with a master UPS group, which will be discussed in more detail below.

While FIG. 1 depicts certain switches (Q1, Q2, K4, K6, K7, SSM) open and others closed, it will be appreciated that control system 175 may send appropriate control signals to change the state of these switches. As such, it will be appreciated that the state of the switches may differ from the state actually depicted in FIG. 1, but will be discussed in context with reference to FIG. 1.

During inverter feed path 115 operation, the rectifier 130 converts the input power supply 117 to regulated DC to charge the battery 135 as well as supply power to the inverter 140. The inverter 140 converts the DC to a voltage & frequency regulated AC output at all times. During "stored energy" mode, that is, during an absence of power from power supplies 112 and 117 (also referred to as mains failure), the inverter 140 draws power from the battery 135 and continues to supply output power. Bypass operation that switches in the bypass feed path 110 is possible through the first switch 120, which may be a Static Switch Module (SSM) for example.

In an exemplary embodiment, the startup of rectifier 130 is accomplished automatically via switch (K4—circuit breaker) 155 or manually via switch (Q4—manual disconnect), manual bypass is accomplished via switch (Q2) 170, output power is supplied via switch (Q1) 165, short-circuit protection of SSM 120 is provided by switch (K6), and output power from inverter 140 is provided via switch (K7) 125. The transitions from the bypass feed path 110 to the inverter feed path 115 and vice-versa are controlled through the SSM 120 and breaker switch (K7) 125.

With an RPA (Redundant Parallel Architecture) concept, (N+M) UPSs are paralleled to supply a load that can be fed by N UPSs only. This way, a redundancy of M units is achieved. To realize the RPA configuration, a communication between the UPSs is required to synchronize the output of each inverter and to share the load among the inverters.

To realize a full digital control for single and parallel UPSs, embodiments of the invention employ dedicated control algorithms and the necessary hardware. In particular, a DSP (digital signal processor) based mother board and a small board for the digital communication between the units is employed. In an embodiment, this communication is made very reliable by doubling the communication channels (redundancy) and by using CRC (cyclic redundancy check) error controls.

This powerful and flexible control board scheme is used on various kinds of LTPSs and power quality systems, such as single and parallel units, with or without an output isolation transformer, with or without an input active filter, and with or without a stand alone active filter, for example. This adaptability is obtained through software configurations.

To allow multiple configurations of uninterruptible power supply in critical power management systems, embodiments of the invention employ an Intelligent Synchronization Module (ISM) that ties one or two groups of UPSs to realize one or more of the following five different functions:

F1) Intelligent Static Transfer Switch

Synchronize permanently the outputs of two separate and independent UPS groups, where an Intelligent Static Switch (ISS) decides where to switch the load;

F2) Centralized Bypass

Command the centralized bypass of a group of UPSs in a RPA configuration;

F3) Load Bus Synchronization

Synchronize temporarily the outputs of two separate and independent UPS groups;

F4) Power Tie

Synchronize permanently and load share the outputs of two separate and independent UPS groups; and F5) Bus Repeater Allow an extension of the maximal distance between the first and the last UPS.

Figure 3:
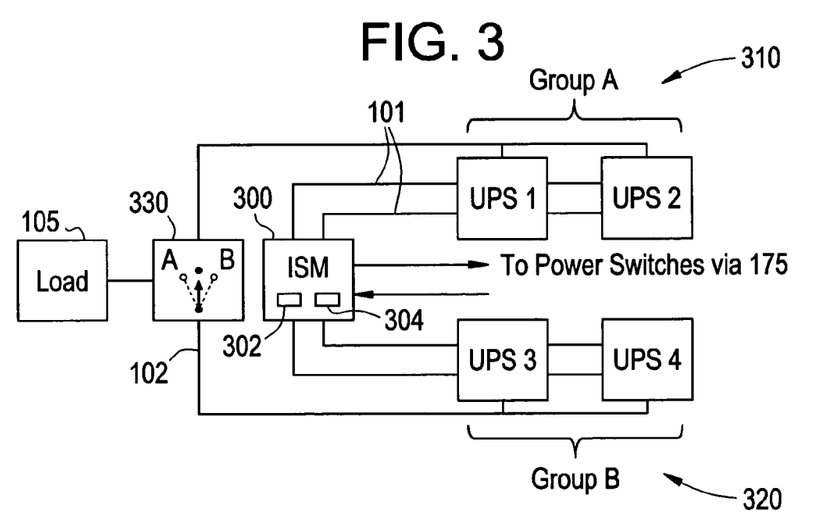
FIG. 3 depicts an exemplary intelligent synchronization module (ISM) in combination with two groups of UPSs in accordance with an embodiment of the invention.

With reference now to FIG. 3, the principle of the ISM 300 will be discussed. In an embodiment, the ISM 300 is disposed between a first 310 and a second 320 group of UPSs 100 (separately illustrated as UPS 1, UPS 2, UPS 3 and UPS 4, for example, but having the configuration illustrated in FIG. 2 and discussed above), and an ISS 330 that decides which UPS group will service the load 105. For simplicity, FIG. 3 illustrates only the communication lines 101 between ISM 300 and the two groups of UPSs, however, it will be appreciated by one skilled in the art that the UPSs also have power lines 102 connecting them to the ISS 330. Each UPS group has a master UPS, such as UPS 1 for group A 310, and UPS 3 for group B 320, for example. The master UPS serves to control the synchronization of the UPSs 100 within its group. The ISM 300 controls synchronization between first 310 and second 320 UPS groups by providing control commands to the appropriate control system 175 associated with the UPSs 100.

The ISM 300 has the function of assigning one of the UPS groups, such as the first group 310 for example, the role of master group and the other UPS group, such as the second group 320 for example, the role of slave group. The ISM 300 also has the function of passing phase information relating to the master group 310 to the slave group 320, thereby enabling the master UPS (UPS 3) of the slave group 320 to effect synchronization with the master group 310. To carry out this synchronization process, the ISM 300 has a processing circuit 302, and a storage medium 304, readable by the processing circuit 302, storing instructions for execution by the processing circuit 302 for carrying out the necessary control algorithms, which will be discussed in more detail below.

Figure 4:
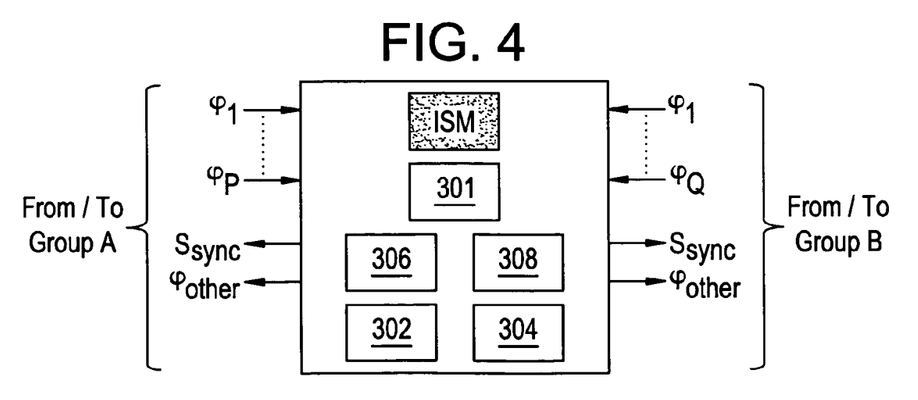
FIG. 4 depicts an exemplary intelligent synchronization module (ISM) in accordance with embodiments of the invention.

Referring now to FIG. 4, an exemplary ISM 300, illustrated in block diagram form, includes processing circuit 302, storage medium 304, a DSP board 306, and a communication board 308 having increased capability able to deal with four communication channels. As illustrated, the ISM 300 is able to exchange information with the two independent UPS groups (group A 310, and group B 320), interpret the operator commands, and command the power switches. As a result, the five aforementioned functions F1-F5 may be realized by software configuration only. To maximize the reliability, an embodiment of the ISM 300 has a redundant communication and a redundant power supply, fed by the output of both UPS groups. In addition, for very critical applications it is possible to use redundant ISM modules 300 to assure a full redundancy of the control electronics.

The input signals to ISM 300 include phase information $\phi 1$ through $\phi P$, or $\phi 1$ through $\phi Q$, from each UPS group A and B, where P represents the number of UPSs in group A and Q represents the number of UPSs in group B. The output signals from ISM 300 include the $S_{sync}$ signal and the $\phi_{other}$ signal. The $\phi_{other}$ signal represents the actual phase of the master UPS group, and the $S_{sync}$ signal represents a command signal for the slave UPS group to synchronize with the master UPS group.

Figure 5:
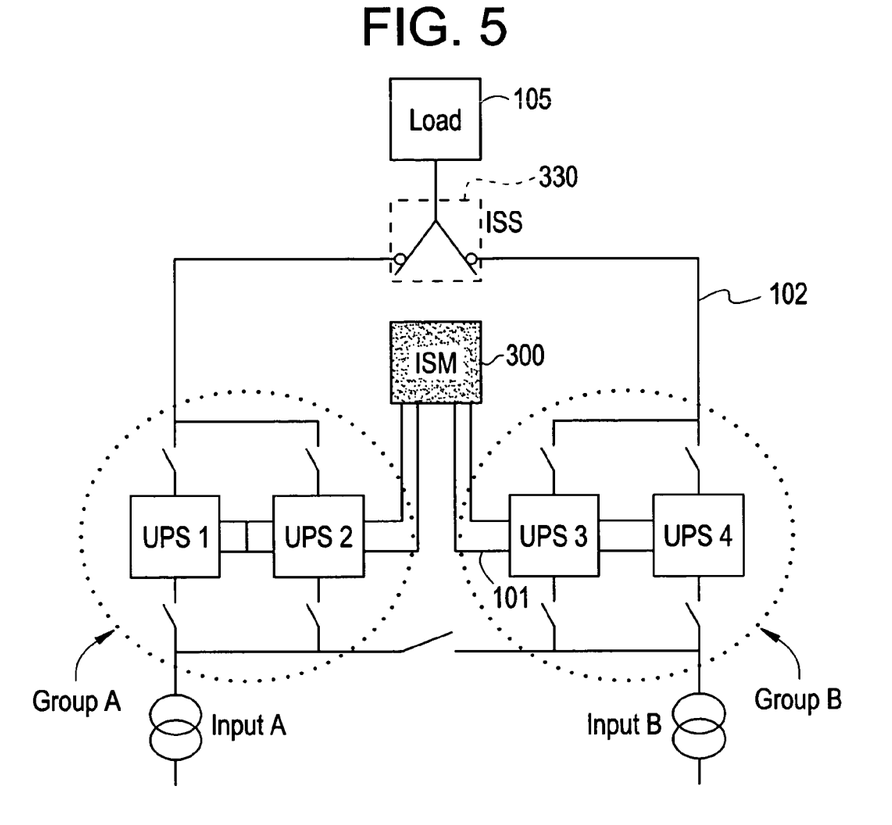
FIGS. 5-10 depict alternative exemplary configurations for employing the ISM of FIG. 4 in accordance with an embodiment of the invention.

With reference now to FIG. 5, the Intelligent Static Transfer Switch Function (F1) will be discussed.

FIG. 3 shows the principle of the use of ISM 300 in combination with ISS 330, and FIG. 5 expands on this principle. For the configuration illustrated in FIG. 5, four UPSs 100 (UPS 1, UPS 2, UPS 3 and UPS 4) are organized in two groups A and B in a 2+2 configuration. The load 105 is connected to the ISS 330, which continuously monitors the two input sources A and B, which may be provided by a utility or other means as discussed previously with reference to FIG. 2, and decides where to switch the load depending on the quality of the two input sources and on its configuration. Typically, if one source fails, the ISS 330 can be programmed to either stay on the preferred input source or switch, even if the two input sources are in phase opposition. Since an out-of-phase condition is undesirable and dangerous for both the UPS system and the critical load, it is important to keep the outputs of the two UPS groups synchronized. The synchronization function is performed by the ISM 300, which synchronizes one group (slave UPS group B for example) to the other group (master UPS group A for example). The master UPS group is also herein referred to as the sync Master. Through a front panel module 301 of the ISM 300, a user may select various working modes, thereby making it possible to keep the two groups isolated, to force the sync master to group A or B, and also to let the ISM 300 decide which one of the two groups is the sync Master. The ISM 300 considers, among other things, the availability and the state of the two inputs sources A and B. In addition, the synchronization may be activated continuously or just under certain phase error conditions.

Regarding FIGS. 5-10 generally, the lines connecting ISM 300 to the UPSs 100 represent communication and control lines, while the lines connecting the UPSs 100 to the input sources and the load represent power distribution lines. Also, it will be appreciated by one skilled in the art that graphical symbols suggestive of switches, while not specifically identified by a reference numeral, do indeed represent power distribution switches, such as circuit breakers or the like.

Figure 6:
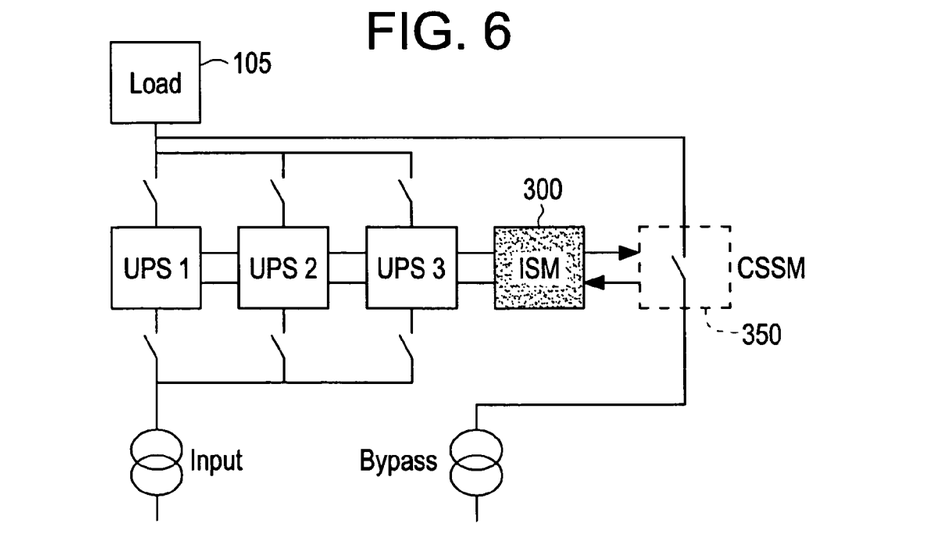

With reference now to FIG. 6, the Centralized Bypass Function (F2) will be discussed.

As previously mentioned, there are several possible UPS configurations that may be employed to supply a critical load. With the RPA (Redundant Parallel Architecture) concept, (N+M) UPSs are paralleled to supply a load that can be fed by N UPSs only. This way, a redundancy of M units is achieved. In a RPA configuration, we have decentralized bypasses, that is, each UPS 100 has its own bypass feed path 110 and Static Switch Module (SSM) 120 (see FIG. 2 for example). This improves the reliability of the global power system as a redundancy of M bypasses is also achieved. The situation is even more favorable as these decentralized bypasses are sized for more than the nominal power.

In some critical power management systems, a centralized bypass is required, even if the global reliability is reduced. This feature may be implemented in a RPA configuration using the ISM 300 as represented in FIG. 6 for a group of three UPSs (UPS 1, UPS 2 and UPS 3). The ISM 300 exchanges information with all the UPSs and commands a Centralized Static Switch Module (CSSM) 350, which serves as an external (centralized) bypass to all UPSs. In addition, the ISM 300 measures the bypass voltages and the load currents.

The implementation of a centralized bypass in a RPA system with the ISM 300 may be realized in two ways. First, and with regard to cost minimization, the internal bypass SSM 120 (see FIGS. 1 and 2 for example) of each UPS 100 is removed, which is referred to as the modular concept. Second, and with regard to increasing reliability of the RPA system, the internal bypasses SSM 120 are used as a backup for the external bypass provided by the CSSM 350.

In an embodiment that combines features of both the first and the second implementations, which also strives for cost minimization, the internal bypasses (SSMs) of each UPS may be used in combination with an external centralized breaker that is commanded by the ISM 300. Here, the centralized breaker may replace the CSSM 350.

Figure 7:
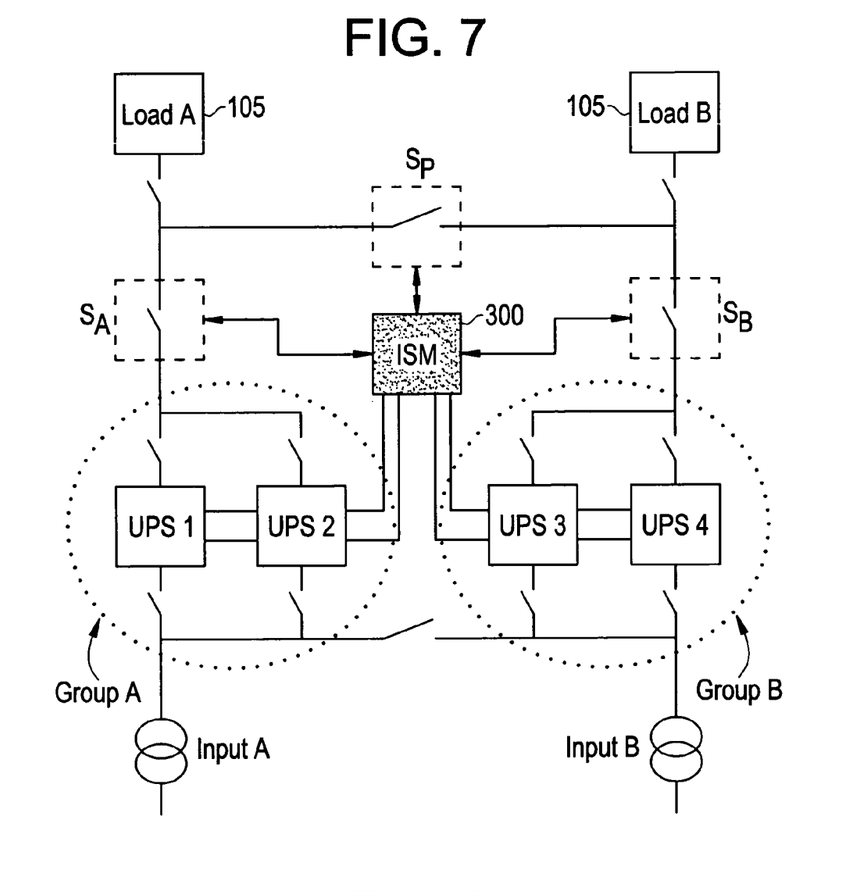

With reference now to FIG. 7, the Load Bus Synchronization Function (F3) and the Power Tie Function (F4) will be discussed.

FIG. 7 illustrates the principle of using the ISM 300 to realize a Load Bus Synchronization Function (F3), that is, to synchronize temporarily the outputs of two separate and independent UPS groups A and B. In the embodiment of FIG. 7, four UPSs (UPS 1, UPS 2, UPS 3 and UPS 4) are organized into two groups A and B. To carry out maintenance work on one UPS group, all of the load 105, depicted as Load A and Load B, has to be transferred to the other UPS group. Consider an example where initially the two systems operate independently, that is, breaker $S_p$ is open while breakers $S_A$ and $S_B$ are closed. If now UPS 3 needs to be repaired, Load B has to be transferred to input source A. For this, we have first to synchronize UPS group B to UPS group A, then close breaker $S_p$, and after a short while open the breaker $S_B$. At this time, Load B has been transferred to input source A and the UPS group B can be switched off, disconnected from input source B via switches illustrated, for maintenance. In an embodiment, breakers $S_p$, $S_A$ and $S_B$, may be remotely controlled by means known in the art.

Figure 8:
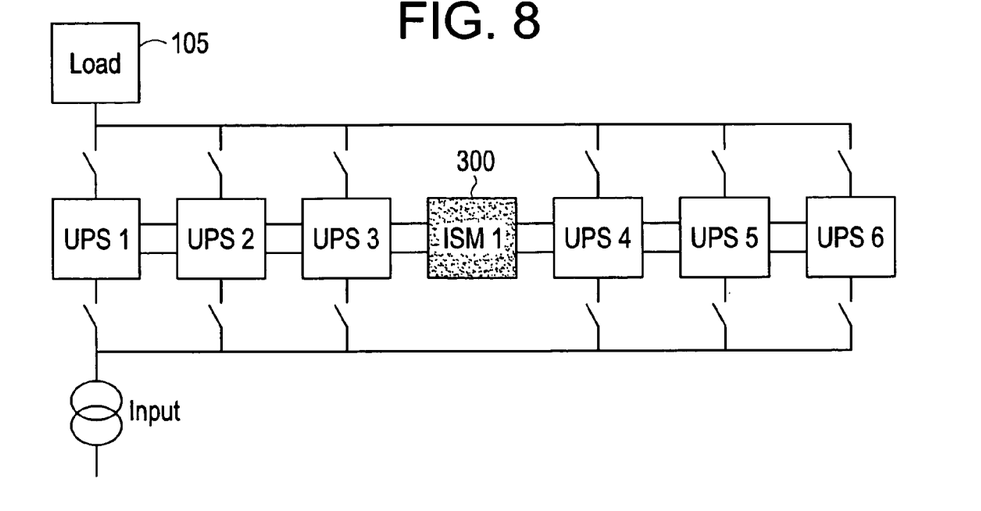

FIG. 7 also illustrates the principle of using the ISM 300 to realize a Power Tie Function (F4), that is, synchronizing permanently and load sharing the outputs of two separate and independent UPS groups. As previously discussed, FIG. 7 illustrates four UPSs organized into two groups A and B. Assume for example that Load A is too high for UPS group A, that UPS group A is not redundant, and that UPS group B is only slightly loaded. To make the global system redundant we want to share the global load (Load A plus Load B) between the two UPS groups A and B. For this, we first have to synchronize group B (slave UPS group) to group A (master UPS group), then close breaker $S_p$, and finally load share the global load. By employing an embodiment of the ISM 300 disclosed herein, it is possible to realize the Load Bus Synchronization and the Power Tie features in the configuration illustrated by implementing the appropriate control algorithms via ISM 300. In addition, a system upgrade that adds more UPSs may be accomplished in a simple and straightforward manner. With reference now to FIG. 8, the Bus Repeater Function (F5) will be discussed.

In an exemplary RPA configuration employing embodiments of the invention, eight UPSs (only six being shown in FIG. 8) may be paralleled within a maximal distance, which represents the distal limit achievable by a given data transmission system. By employing an embodiment of the invention, however, and for those applications where this maximal distance is not enough, ISM 300 may be employed as a bus repeater to control the desired synchronization function for those UPSs beyond the maximal distance. This is illustrated in FIG. 8 by UPSs 4, 5 and 6 being situated beyond the maximal distance from UPS 1.

Figure 9:
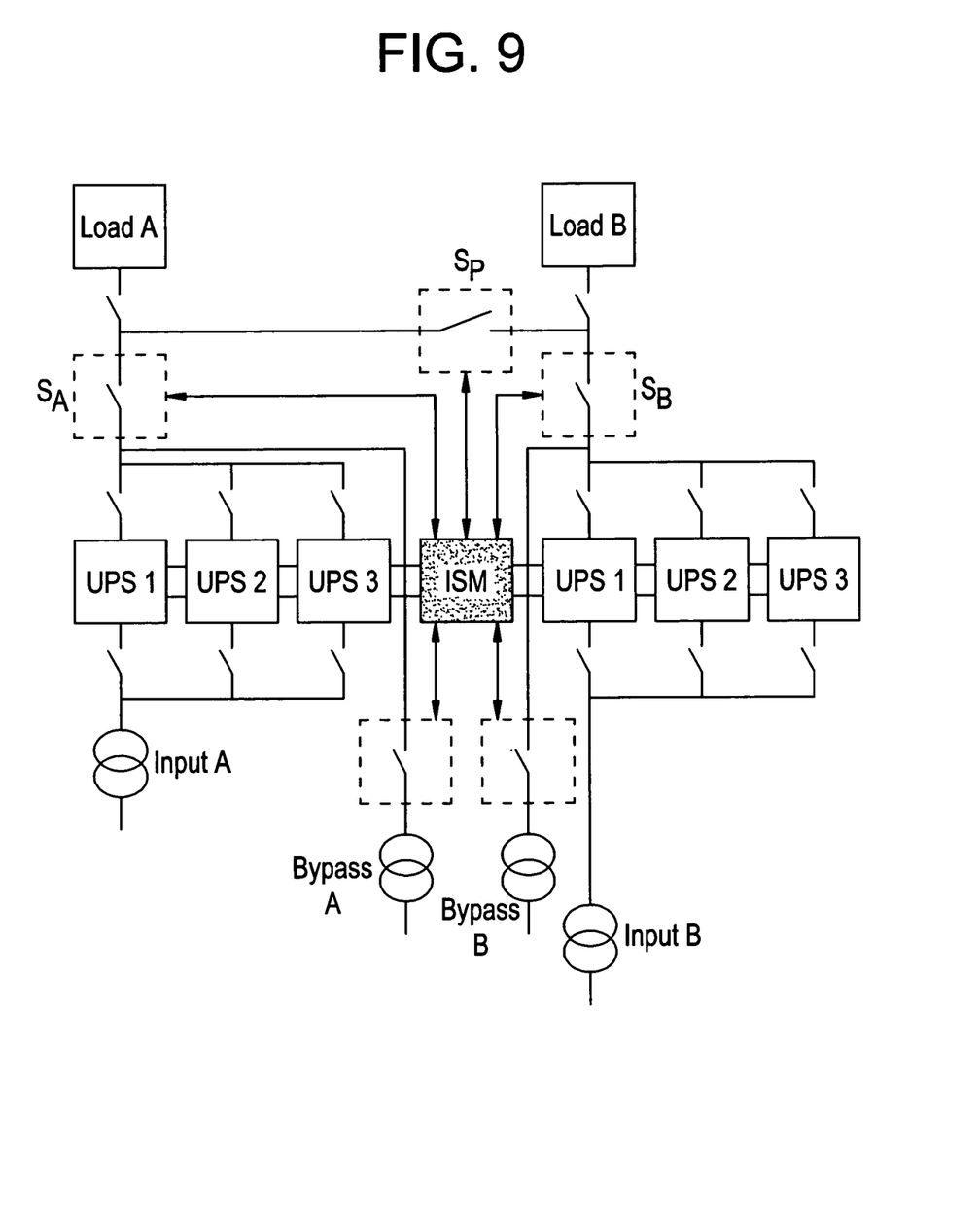

In an alternative exemplary embodiment, the ISM 300 may also be used to realize combined functions, such as Load Bus Synchronization and/or Power Tie in combination with Centralized Bypass, which is illustrated by FIG. 9.

Figure 10:
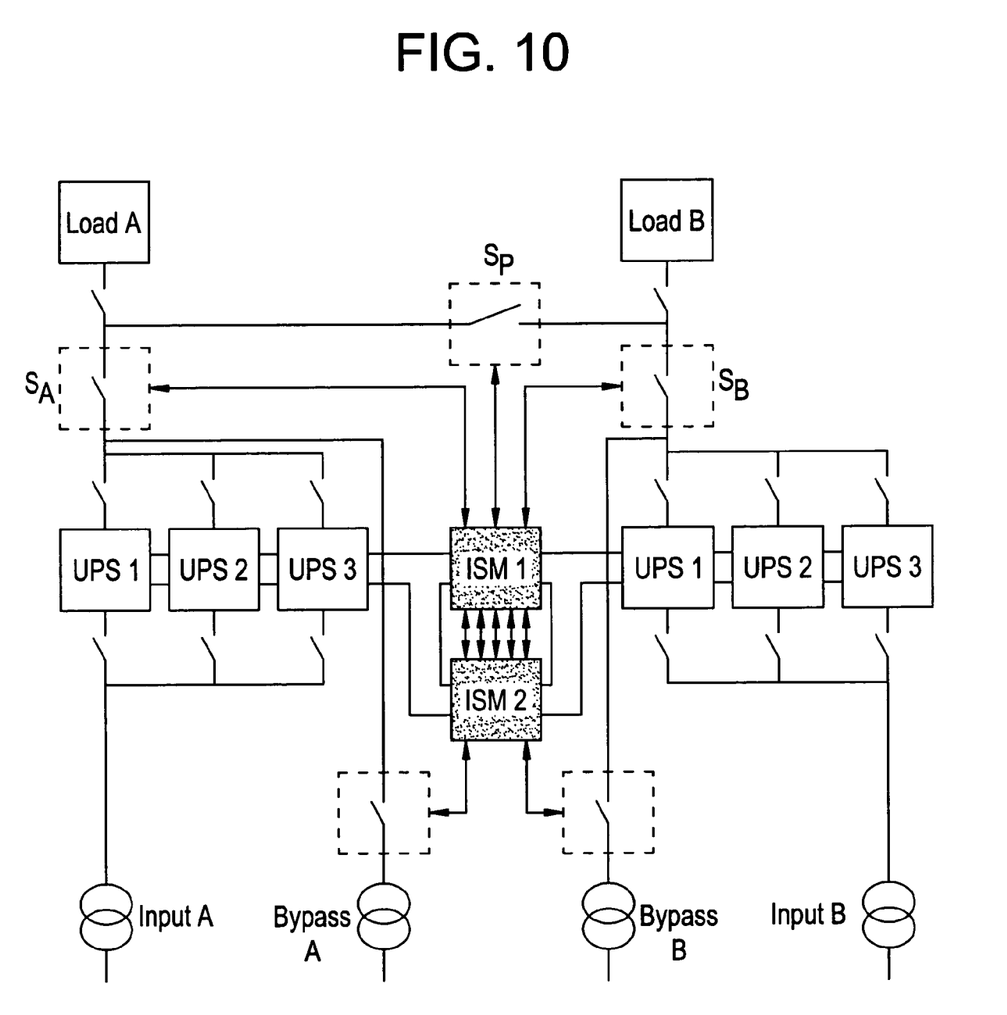

In another alternative exemplary embodiment, the ISM 300 may also be used to realize the combined functions of Load Bus Synchronization and/or Power Tie in combination with Centralized Bypass with Redundant ISM, which is illustrated in FIG. 10. To maximize system reliability, especially when two functions are combined, it is possible to use more then one ISM module 300. As an example, FIG. 10 shows the use of two ISM modules 300 to implement the Load Bus Synchronization and/or Power Tie Function combined together with the Centralized Bypass Function. In this case, not only is the power supply of each ISM redundant, but the control electronics of each ISM are also redundant.

Algorithms for implementing the Intelligent Static Transfer Switch Function (F1) will now be discussed with reference to FIGS. 11-13.

Figure 11:
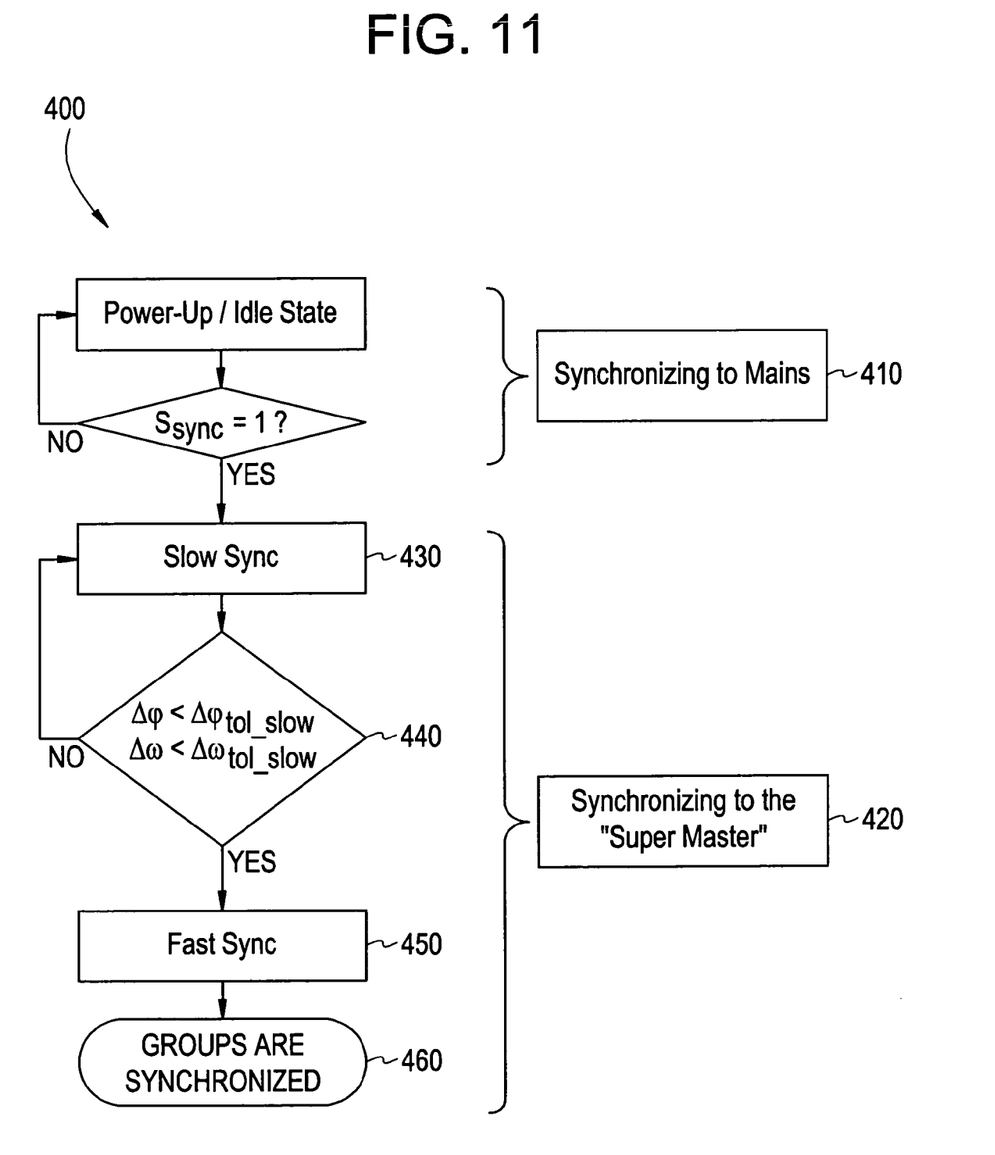
FIGS. 11-13 depict exemplary control algorithms for use in accordance with embodiments of the invention.

Referring now to FIG. 11, a control algorithm 400 is depicted for execution by the control system 175 of the master UPS of the slave UPS group for implementing the aforementioned synchronization function. As previously discussed, the ISM 300 and the UPSs 100 of both groups A and B are all connected through redundant communication cables, thereby enabling the ISM 300 to see the phase (Pi of all the UPSs of both groups A and B. It is possible to keep the two groups isolated, to force the synchronization master UPS group to be group A or B, and finally, based on the availability and quality of the input mains, to let the ISM 300 decide which one of the two groups is going to be the master UPS group. The slave UPS group will receive the command to synchronize onto the master group, which is achieved by applying the $S_{SYNC}$ signal, and by passing the actual phase information $\phi_{other}$ of the master group, through to the slave group.

In and exemplary embodiment, the function of the ISM 300 is to assign a group the role of master UPS group, and then to pass the phase information to the slave UPS group. The flow diagram of FIG. 11 shows this synchronization process 400. However, it is first noted that the synchronization algorithm is to be executed by the master UPS of the slave UPS group, and in the following discussion, reference will be made to this master UPS. After power-up, the UPS will first synchronize to its mains (process loop defined by reference numeral 410). When a $S_{SYNC}$ signal is triggered, via an external command or an automatic command from control system 175, the master UPS will start the synchronization process to the master UPS group (process loop defined by reference numeral 420). Process loop 420 first starts with a slow synchronization algorithm 430, where the frequency and phase of the master UPS of the slave UPS group will be moved close to the reference of the master UPS group. At the end of process 430 and 440, that is, when frequency and phase differences are smaller than the defined thresholds of $\Delta_{\omega_{toSLOW}}$ and $\Delta_{\phi_{toSLOW}}$, respectively, the fast synchronization algorithm 450 will start and the UPS will then be stiff in phase with the master UPS group, resulting in the two UPS groups A and B being synchronized (illustrated by reference numeral 460).

Figure 12:
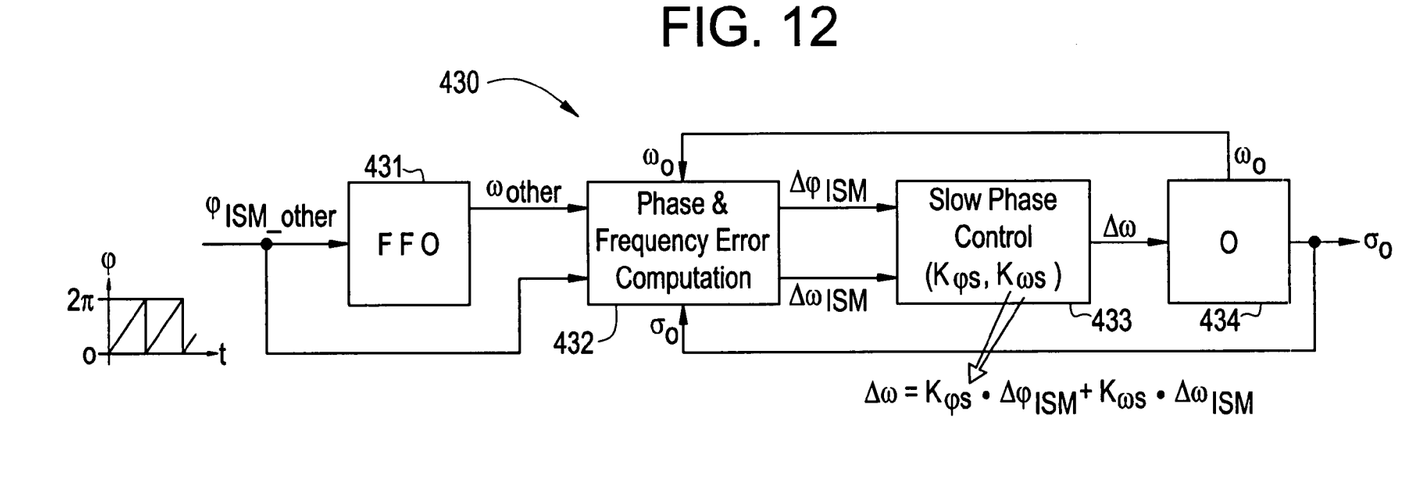

The slow synchronization algorithm 430 is illustrated in FIG. 12 with the control variables illustrated. As depicted, algorithm 430 primarily consists of four modules: a fast frequency observer (FFO) 431, which is basically a fast phase control; a phase & frequency error computation module 432; a slow phase control 433 with its own control parameters $K_{\phi s}$ and $K_{\omega s}$; and, an oscillator (O) 434.

The slow synchronization algorithm 430 is used to move the phase of the output of a slave UPS group, which is already supplying the load, toward that of the master UPS group. This slow synchronization has to be slow enough to guarantee the safety of the critical load. The input to the slow synchronization algorithm 430 is $\phi_{ISM\_other}$, which is the actual phase of the master UPS group. The outputs of the slow synchronization algorithm 430 are the phase and frequency parameters ($\alpha_0$ and $\omega_0$ of the oscillator 434, which refer to the master UPS of the slave UPS group.

Figure 13:
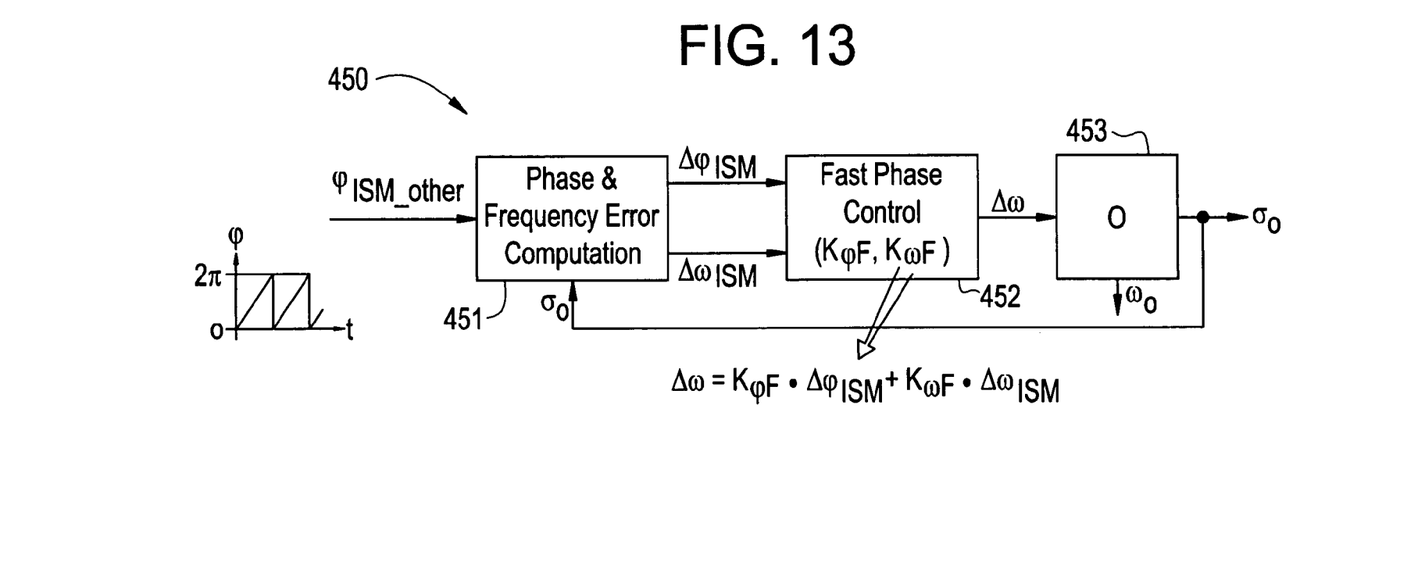

The fast synchronization algorithm 450 is illustrated in FIG. 13 with its control variables illustrated. As depicted, algorithm 450 primarily consists of three modules: a phase & frequency error computation module 451; a fast phase control 452 with its own control parameters; and, an oscillator (O) 453. This fast synchronization algorithm 450 serves to keep the two UPS groups A and B synchronized. Similar to the slow synchronization algorithm 430, the input to the fast synchronization algorithm 450 is $\phi_{ISM\_other}$, which again is the actual phase of the master UPS group, and the outputs are the phase and frequency parameters $\alpha_0$ and $\omega_0$ of the oscillator 434, which again refer to the master UPS of the slave UPS group.

In an embodiment, the slow 430 and fast 450 synchronization algorithms are implemented in firmware, having algorithms driven by control equations, which will now be discussed with reference to FIGS. 12 and 13.

The FFO 431 depicted in FIG. 12 includes an internal oscillator having a phase angle $\phi_{OSC}$ and an angular frequency $\omega_{OSC}$. This internal oscillator is controlled to track the phase angle ($\phi_{ISM\_other}$. Once the oscillator is synchronized to $\phi_{ISM\_other}$ the oscillator angular frequency $\omega_{OSC}$ is a measure for the unknown angular frequency $\omega_{ISM\_other}$. This is why this block is called fast frequency observer. The equations describing the above algorithm are:

$$\Delta\phi_{OSC}=\phi_{ISM\_other}-\phi_{OSC} \quad \text{Equa.-1}$$

$$\Delta\omega_{OSC}=(\Delta\phi_{OSC}-\Delta\phi_{OSCold})/T_E \quad \text{Equa.-2}$$

$$\Delta\phi_{OSCold}=\Delta\phi_{OSC} \quad \text{Equa.-3}$$

$$\Delta\omega_{OSCcom}=\Delta\omega_{OSC}* K_{\omega FFO}+\Delta\phi_{OSC}* K_{\phi FFO} \quad \text{Equa.-4}$$

$$\omega_{OSC}=\omega_{OSC}+\Delta\omega_{OSCcom}* T_E \quad \text{Equa.-5}$$

$$\phi_{OSC}=\phi_{OSC}+\omega_{OSC}* T_E \quad \text{Equa.-6}$$

$$\omega_{other}=\omega_{OSC} \quad \text{Equa.-7}$$

where $T_E$ is the sampling time (100 μs) and $K_{\omega FFO}$, $K_{\omega FFO}$ are the feedback gains for the angular frequency and phase angle errors of the FFO 431. Equation-2 is a simple numerical derivation of $\omega=d\phi/dt$, where the value of $\Delta\phi_{OSCold}$ is the previous sampling (100 μs before) of $\Delta\phi_{OSC}$. Equations-5 and 6 implement the digital oscillator of the FFO 431. In addition, the internal variables are limited to their normal variation range (for example, $\Delta\phi_{OSC}$ between 0 and $2\pi$) as known by one skilled in the art.

The phase & frequency error computation block 432, which is used for the slow synchronization algorithm, may be described by following difference equations:

$$\Delta\phi_{ISM}=\phi_{ISM\_other}-\alpha_o \quad \text{Equa.-8}$$

$$\Delta\omega_{ISM}=\omega_{other}-\omega_o \quad \text{Equa.-9}$$

Referring now to FIG. 13, the phase & frequency error computation block 451, which is used for the fast synchronization algorithm, may be described by following difference equations:

$$\Delta\phi_{ISM}=\phi_{ISM\_other}-\alpha_o \quad \text{Equa.-10}$$

$$\Delta\omega_{ISM}=(\Delta\phi_{ISM}-\Delta\phi_{ISMold})/TE \quad \text{Equa.-11}$$

$$\Delta\phi_{ISMold}=\Delta\phi_{ISM} \quad \text{Equa.-12}$$

The slow phase control block 433 (with reference to FIG. 12 and Equations-8 and 9) may be described by the following equation:

$$\Delta\omega=\Delta\phi_{ISM}* K_{\phi S}+\Delta\omega_{ISM}* K_{\omega S} \quad \text{Equa.-13}$$

The fast phase control block 452 (with reference to FIG. 13 and Equations-10 and 11) may be described by the following equation:

$$\Delta\omega=\Delta\phi_{ISM}* K_{\phi F}+\Delta\omega_{ISM}* K_{\omega F} \quad \text{Equa.-14}$$

The oscillator blocks 434 and 453 (with reference to FIGS. 12 and 13) may be described by following equations:

$$\omega_o=\omega_o+\Delta\omega* T_E \quad \text{Equa.-15}$$

$$\alpha_o=\alpha_o+\omega_o* T_E \quad \text{Equa.-16}$$

In a classical digital PLL (phase lock loop) scheme, the synchronization precision of 10 bits of digital phase information would be too a low resolution for proper synchronization control. However, with the slow and fast synchronization algorithms disclosed herein, a synchronization precision of less than 1 μs may be achieved.

Since only the digital phase information is sent on the communication bus between the ISM and the UPS groups, it is possible to optimize the bandwidth of the transmission. Also, since the slow synchronization algorithm needs the frequency information (see FIG. 12 for example), this information may be extracted from the phase information through an FFO (fast frequency observer) 431. In an embodiment, the slow and fast synchronizations depicted in FIGS. 12 and 13 are implemented using the same algorithm, with the only difference being the feedback gains obtained by assigning different poles to the phase control. Accordingly, different feedback gains lead to different synchronization speed and stiffness.

To determine an appropriate feedback gain, the static stiffness may be defined with respect to the phase and frequency errors. Exemplary relationships are as follows. For slow synchronization, the static stiffness with respect to a frequency error is 16 Hz/sec correction for an error of 1 Hz, and the static stiffness with respect to the phase error is $18/(2\pi)\approx 3$ Hz/s correction for an error of 1 rad, for example. For fast synchronization, the static stiffness with respect to the frequency error is 20 Hz/s correction for an error of 1 Hz, and the static stiffness with respect to the phase error is $100/(2\pi)\approx 16$ Hz/s correction for an error of 1 rad, for example. By assigning different poles to the phase control, it is possible to design a fast and a slow phase control, thereby obtaining two sets of feedback gains.

As used herein, the following variable definitions apply:

$\phi_{ISM\_other}$=phase angle to synchronize to (phase angle of the "supermaster")

$\omega_{other}$=angular frequency of the "supermaster" ($\phi$and $\omega$ are linked by $\omega=d\phi/dt$)

$\omega_o$=angular frequency of the oscillator (of the master of the "superslave"group)

$\alpha_o$=phase angle of the oscillator (of the master of the "superslave" group)

$\Delta\phi_{ISM}$=phase angle error (between the "supermaster" and "superslave" groups)

$\Delta\omega_{ISM}$=angular frequency error (between the "supermaster" and "superslave"groups)

$\Delta\omega$=angular frequency correction to be applied to the oscillator $K_{\phi S}$=feedback gain for the phase angle error–slow synchronization $K_{\omega S}$=feedback gain for the angular frequency error–slow synchronization $K_{\phi F}$=feedback gain for the phase angle error–fast synchronization $K_{\omega F}$=feedback gain for the angular frequency error–fast synchronization.

While embodiments of the invention have been disclosed combinable to provide only certain combinations of functions, it will be appreciated that the possible combinations of ISM modules and functions are not confined to only the above-described examples.

While embodiments of the ISM concept may have been described in relation to a RPA configuration of a particular UPS system, it will be appreciated that the same ISM concept may be applied to other single and parallel UPS systems. It will also be appreciated that the ISM concept presented herein may be applied to UPSs of any power level with or without an isolation transformer.

As suggested in the aforementioned description of the various embodiments, an embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. The technical effect of the executable instructions is to exchange information, perform synchronization, and execute control algorithms and commands between two separate and independent UPS groups thereby allowing multiple configurations of uninterruptible power supply in critical power management systems.

As disclosed, some embodiments of the invention may include some of the following advantages: an Intelligent Synchronization Module (ISM) that allows multiple configurations of uninterruptible power supply (UPS) in critical Power management systems; the availability of five different functions F1-F5 that may be realized by software configuration only; the ability to combine and realize more functions by a single ISM module; an exemplary ISM may have a redundant communication and a redundant power supply in order to maximize system reliability; the possibility of using redundant ISM modules for very critical applications to assure a full redundancy of the control electronics; an Intelligent Synchronization Module (ISM) that ties one or two groups of UPSs to realize five different functions F1-F5; for the function of "Intelligent Static Transfer Switch" (F1), an embodiment of the ISM that synchronizes the outputs of two separate and independent UPS groups; for the function of "Centralized Bypass" (F2), an embodiment of the ISM that commands the centralized bypass of a group of UPSs in a RPA configuration, where in a first embodiment, the ISM doesn't use the internal UPS bypasses any more, in a second embodiment, the internal bypasses of the UPSs are used as a backup for the external centralized bypass, thereby providing the maximal reliability even higher than the one of a RPA configuration, and in a third embodiment, using the internal bypasses of each unit in combination with an external centralized breaker commanded by the ISM; for the function of "Load Bus Synchronization" (F3), an embodiment of the ISM that synchronizes temporarily the outputs of two separate and independent UPS groups; for the function of "Power Tie" (F4), an embodiment of the ISM that synchronizes permanently and load shares the outputs of two separate and independent UPS groups; for the function of "Bus Repeater" (F5), an embodiment of the ISM that allows extension of the maximal distance between the first and the last UPS in a RPA configuration; an ISM that provides a flexible multi-functional product, where the five aforementioned functions F1-F5 may be realized by software configuration only; the ability to include in the ISM a redundant communication feature and a redundant power supply; the ability to use redundant ISM modules for very critical applications to assure a full redundancy of the control electronics; an ISM capable of implementing more than one function at the same time; the ability to combine functions via the ISM; slow and fast synchronization algorithms that allow the ISM to synchronize two groups of UPSs already supplying their critical load; the ability to send a low resolution signal (10 bits) of digital phase information through the communication bus connecting the ISM to the UPS groups, thereby enabling the precision of the synchronization algorithms to be less than 1 µs; and, the ability to send only the digital phase information on the communication bus, thereby enabling optimization of the bandwidth of the transmission, and since the slow synchronization algorithm also needs the frequency information, this information may be extracted from the phase information through an FFO (fast frequency observer).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An Intelligent Synchronization Module (ISM) for an Uninterruptible Power Supply (UPS) system for servicing a load, wherein the UPS system has a first UPS group having a first energy storage device, the first UPS group coupled to a first power source, and a second separate and independent UPS group having a second energy storage device, the second UPS group being coupled to a second power source, each of the first and second UPS groups having a master UPS, the ISM comprising:
a processing circuit; and
a storage medium, readable by the processing circuit, storing instructions for execution by the processing circuit for:
determining one of the first UPS group and the second UPS group to be a master UPS group, wherein the determination of the master UPS group includes a determination of the availability and quality of said first power source and said second power source;
assigning the other UPS group the role of a slave UPS group; and
passing phase information relating to the master UPS group to the slave UPS group, thereby enabling the master UPS of the slave UPS group to effect synchronization with the master UPS group, wherein synchronization between the master UPS group and the slave UPS group is performed using a slow synchronization process and a fast synchronization process,
wherein the slow synchronization process moves a frequency and a phase of the master UPS of the slave UPS group towards a frequency and phase of the master UPS group at a first rate, and
wherein, when differences between the frequencies and phases of the slave UPS group and master UPS group are less than defined thresholds, the fast synchronization process is started and the frequency and the phase of the master UPS of the slave UPS group are moved until synchronous with the frequency and the phase of the master UPS of the master UPS group at a second rate that is greater than the first rate.

2. The ISM of claim 1, wherein the first and second UPS groups are connected to an Intelligent Static transfer Switch (ISS), the ISS configured to decide where to switch the load, and wherein the storage medium further stores instructions for execution by the processing circuit for:
synchronizing permanently outputs of the first and second UPS groups, thereby providing an intelligent static transfer switch function (F1).

3. The ISM of claim 1, wherein the UPS system has a Redundant Parallel Architecture (RPA) including one of the first and second UPS groups and a Centralized Static Switch Module (CSSM), and wherein the storage medium further stores instructions for execution by the processing circuit for:
commanding the CSSM, thereby providing a centralized bypass function (F2).

4. The ISM of claim 1, wherein the first and second UPS groups are connected by a circuit breaker, and wherein the storage medium further stores instructions for execution by the processing circuit for:
synchronizing temporarily outputs of the first and second UPS groups, thereby providing a load bus synchronization function (F3).

5. The ISM of claim 1, wherein the first and second UPS groups are connected by a circuit breaker, and wherein the storage medium further stores instructions for execution by the processing circuit for:
synchronizing permanently and load sharing outputs of the first and second UPS groups, thereby providing a power tie function (F4).

6. The ISM of claim 1, wherein the UPS system has a plurality of paralleled UPS groups, and wherein the storage medium further stores instructions for execution by the processing circuit for:
controlling the connection of each UPS within each UPS group relative to the load, allowing an extension of a maximal distance between a first UPS and a last UPS in the UPS system, thereby providing a bus repeater function (F5).

7. The ISM of claim 1, wherein:
in response to phase information relating to each UPS of the first and second UPS groups, a first signal representative of an actual phase of the master UPS group, and a second signal representative of a synchronization command, are provided to the slave UPS group.

8. An Uninterruptible Power Supply (UPS) system for servicing a load, comprising:
a first input power source;
a second input power source separate and independent of the first input power source;
a first UPS group coupled to the first input power source, the first UPS group having a first energy storage device electrically coupled to provide electrical power to the load;
a second UPS group separate from and independent to the first UPS group coupled to the second input power source, the second UPS group having a second energy storage device electrically coupled to provide electrical power to the load, wherein each of the first and second UPS groups are configured to service the load; and
an Intelligent Synchronization Module (ISM) in signal communication between the first and second UPS groups, the ISM configured to determine an availability and quality of the first power source and the second power source, the ISM further configured to determine one of the first UPS group and the second UPS group will be a master UPS group based on the availability and quality of the first power source and the second power source, wherein the ISM is further configured to assign the determined UPS group a role of master UPS group and the other UPS group a role of slave UPS group, and further configured to pass phase information relating to the master UPS group to the slave UPS group, thereby enabling the slave UPS group to effect synchronization with the master UPS group, wherein synchronization between the master UPS group and the slave UPS group is performed using a slow synchronization process and a fast synchronization process,
wherein the slow synchronization process moves a frequency and a phase of at least one UPS of the slave UPS group towards a frequency and a phase of at least one UPS of the master UPS group at a first rate, and
wherein, when differences between the frequencies and phases of the slave UPS group and master UPS group are less than defined thresholds, the fast synchronization process is started and the frequency and the phase of the at least one UPS of the slave UPS group are moved until synchronous with the frequency and the phase of the at least one UPS of the master UPS group at a second rate that is greater than the first rate.

9. The UPS system of claim 8, further comprising:
an Intelligent Static transfer Switch (ISS) disposed to electrically connect at least one of the first and the second UPS group to the load, the ISS configured to decide to which UPS group to connect to the load.

10. The UPS system of claim 8, wherein:
at power up and prior to synchronizing the slave UPS group to the master UPS group, the master UPS of the slave UPS group is configured to synchronize the slave UPS group to its own mains.

11. The UPS system of claim 8, wherein:
as part of the slow synchronization process, the frequency and phase of the slave UPS group are shifted towards a reference of the master UPS group until the frequency and phase differences between the master and slave UPS groups are each below defined thresholds.

12. The UPS system of claim 11, wherein:
as part of the fast synchronization process, the frequency and phase of the slave UPS group are further shifted to be in phase with the master UPS group, thereby resulting in the slave UPS group being synchronized with the master UPS group.

13. The UPS system of claim 12, wherein:
the ISM is configured to synchronize permanently outputs of the master and slave UPS groups, thereby providing a synchronized intelligent static transfer switch function (F1).

14. The UPS system of claim 8, wherein:
the slow synchronization process is configured to facilitate a slower synchronization of the slave UPS group to the master UPS group as compared to the fast synchronization process.

15. The UPS system of claim 8, wherein:
the slow synchronization process comprises a fast frequency observer block in logic communication with a phase and frequency error computation block, which is in logic communication with a slow phase control block, which is in logic communication with an oscillator; and
a slow synchronization process input comprises the phase angle to synchronize to, and a slow synchronization process output comprises angular frequency and phase angle parameters of an oscillator.

16. The UPS system of claim 8, wherein:
the fast synchronization process comprises a phase and frequency error computation block in logic communication with fast phase control block, which is in logic communication with an oscillator; and
a slow synchronization process input comprises the phase angle to synchronize to, and a slow synchronization process output comprises angular frequency and phase angle parameters of an oscillator.

17. An Uninterruptible Power Supply (UPS) system for servicing a load, comprising:
a first UPS group coupled to a first power source and having a first energy storage device electrically coupled to provide electrical power to the load, said first UPS group having a first master UPS and at least one first slave UPS, said first master UPS and said at least one first slave UPS each having a rectifier and an inverter, wherein said at least one first slave UPS is operably coupled to said first master UPS to operate at the same phase parameters as said first master UPS;
a second UPS group coupled to a second power source and having a second energy storage device electrically coupled to provide electrical power to the load, said second UPS having a second master UPS and at least one second slave UPS, said second master UPS and said at least one second slave UPS each having a rectifier and an inverter, wherein said at least one second slave UPS is operably coupled to said second master UPS to operate at the same phase parameters as said second master UPS; and
an Intelligent Synchronization Module (ISM) in signal communication with said first and second UPS groups, the ISM configured to determine an availability and quality of said first power source and said second power source, the ISM further configured to determine one of said first UPS group and said second UPS group to be a master UPS group based on the availability and quality of said first power source and said second power source, wherein said ISM is further configured to assign the determined UPS group a role of master UPS group and the other UPS group a role of slave UPS group, and further configured to pass phase information relating to said master UPS of said master UPS group to said master UPS of said slave UPS group, thereby enabling said slave UPS group to effect synchronization with said master UPS group, wherein synchronization between the master UPS group and the slave UPS group is performed using a slow synchronization process and a fast synchronization process,
wherein the slow synchronization process moves a frequency and a phase of the master UPS of the slave UPS group towards a frequency and phase of the master UPS group at a first rate, and
wherein, when differences between the frequencies and phases of the slave UPS group and master UPS group are less than defined thresholds, the fast synchronization process is started and the frequency and the phase of the master UPS of the slave UPS group are moved until synchronous with the frequency and the phase of the master UPS of the master UPS group at a second rate that is greater than the first rate.

18. The UPS of claim 17 further comprising:
a static switch arranged to switch an electrical connection between said first UPS group and said second UPS group;
wherein said first UPS group is configured to receive electrical power from said first power source having a set of first phase parameters and output electrical power at a second set of phase parameters;
wherein said second UPS group is configured to receive electrical power from said second power source having a set of third phase parameters and output electrical power at said second set of phase parameters;
wherein said static switch is configured to switch the electrical connection from said first UPS group to said second UPS group in response to a loss of power from said first UPS group.

19. The ISM of claim 1, wherein during synchronization the master UPS of the master UPS group provides only a phase to the master UPS of the slave UPS group.

20. The ISM of claim 1, wherein the slow synchronization process and the fast synchronization process achieve a synchronization precision of less than 1 µs.

* * * * *

UNITED STATES PATENT AND TRADEMARK OFFICE
CERTIFICATE OF CORRECTION

PATENT NO. : 8,754,544 B2  
APPLICATION NO. : 11/285587  
DATED : June 17, 2014  
INVENTOR(S) : Colombi et al.

Page 1 of 1

It is certified that error appears in the above-identified patent and that said Letters Patent is hereby corrected as shown below:

In the Specification

In Column 4, Line 65, delete "LTPSs" and insert -- UPSs --, therefor.

In Column 8, Line 16, delete "more then" and insert -- more than --, therefor.

In Column 8, Line 32, delete "(Pi" and insert -- $\phi_i$ --, therefor.

In Column 9, Line 35, delete "($\phi_{ISM\_other}$." and insert -- $\phi_{ISM\_other}$. --, therefor.

Signed and Sealed this  
Thirtieth Day of September, 2014

Michelle K. Lee  
*Deputy Director of the United States Patent and Trademark Office*